United States Patent

[11] 3,632,906

[72] Inventor Toru Aihara
Sagamihara-shi, Japan
[21] Appl. No. 71,878
[22] Filed Sept. 14, 1970
[45] Patented Jan. 4, 1972
[73] Assignee Caterpillar Mitsubishi Ltd.
Tokyo, Japan

[54] CABLE WINDER ON TRACTOR
2 Claims, 6 Drawing Figs.

[52] U.S. Cl. ................................................. 191/12.2 A
[51] Int. Cl. ....................................................... H02j 11/02
[50] Field of Search ........................................... 191/12.2 R, 12.2 A, 12.4

[56] References Cited
UNITED STATES PATENTS

| | | | |
|---|---|---|---|
| 853,522 | 5/1907 | Shaver | 191/12.2 A |
| 2,450,257 | 9/1948 | Simmons | 191/12.2 R |
| 2,483,760 | 10/1949 | Duncan | 191/12.2 R UX |
| 3,374,319 | 3/1968 | Stahmer | 191/12.4 |

*Primary Examiner*—Arthur L. La Point
*Assistant Examiner*—George H. Libman
*Attorney*—Fryer, Tjensvold, Feix, Phillips & Lempio ABSTRACT: A cable winder mounted on a tractor for a construction machine, which uses an electric motor as a prime mover. In the present invention is installed a reel driven with a torque motor. The tension of a hanging cable and the torque of the torque motor is balanced when the machine stands still; when it moves forward, the cable is tensioned and the torque motor reverses, and the cable is unwound from the reel. When the machine moves backward, cable tension decreases, the torque motor normally moves to wind the cable on the reel.

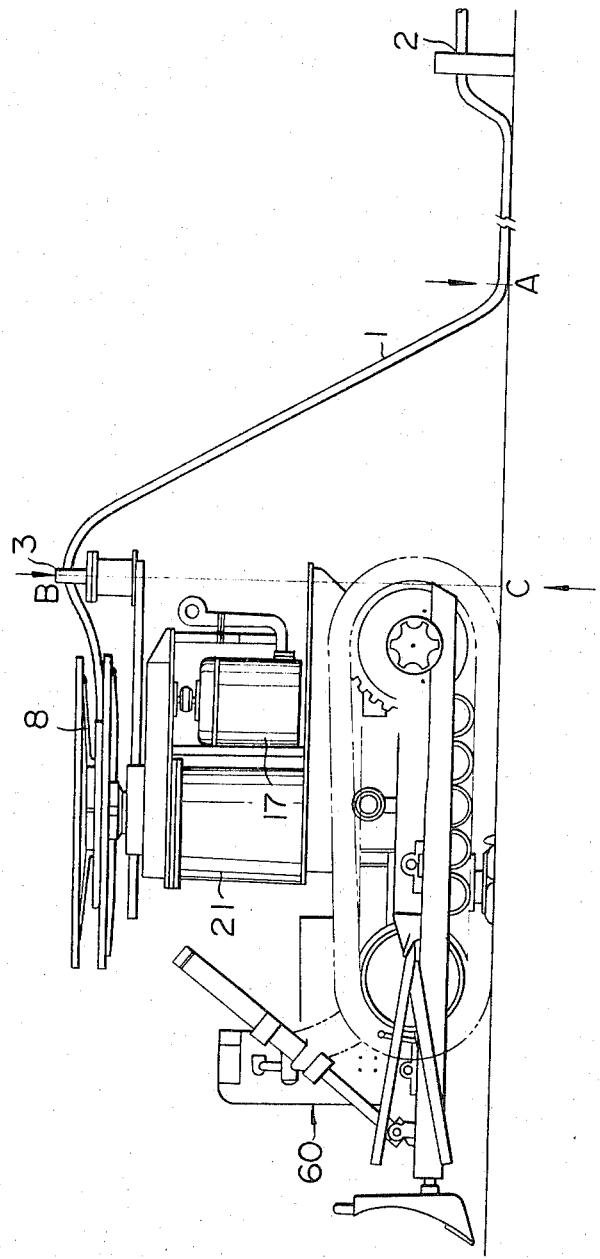
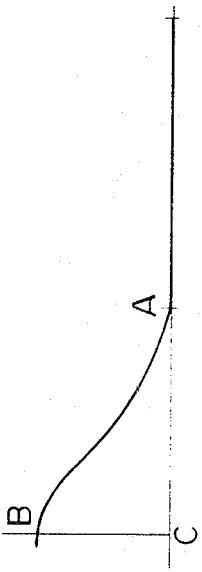
Fig. 1
Fig. 2

CABLE WINDER ON TRACTOR

The present invention relates to a cable winder mounted on a track-type or wheel-type tractor. Hitherto a tractor with an earthmoving machine using a motor as a prime mover has been employed. Power is supplied from an electric source by means of a cable. Without any winder for the cable a tractor connected with a construction or earthmoving machine makes it a rule to advance or retreat dragging the cable, which is in contact with the ground. For this reason there are many accidents of cable injuries or breakages due to the interference of obstacles.

In order to avoid such injuries of the cable, it should not be dragged when a tractor maneuvers. Assume that a tractor moves forward. The cable may be extended for a distance equal to the distance covered by the tractor moves backward. The cable may be reduced in length so much. It is difficult for a cable to stretch or shrink by itself, but it is sufficient for a reel to unwind or wind the cable. After all, a cable winder is to be mounted on a tractor. In the present invention, a torque motor is used in rotating a winding reel. Normally a cable hangs on the ground from the reel mounted above a tractor. The tension of the hanging cable causes a torque on the reel through the cable. The tension of the cable and the torque of a torque motor is equally balanced. When the tractor does not advance or retreat and is in neutral, the torque motor is in equilibrium and the reel will not move. However when a tractor starts to advance, the tension of torque increases to reverse the rotation of the torque motor and to unwind the cable from the reel. When a tractor starts to retreat, the torque motor rotates normally to wind a cable on the reel. As described above, even when a tractor advances or retreats, there is no dragging of the cable. In other words with the advance or retreat of the tractor the cable wound on the reel makes a relative motion. Further by installing a radial reel assembly and a pulley assembly a cable is caused to follow any maneuvering direction of a tractor.

The primary object of the present invention is to provide a cable winder with which the operation of the machine is possible while a cable follows any moving direction of a tractor without being dragged on the ground.

Another object of the present invention is to provide a sufficient cable winder in remote controlling a part of the operating device with an electric wire from a stationary source of electricity and driving a construction machine unattended.

Another object of the present invention is to provide a reel assembly and a coworking pulley assembly.

An embodiment of the present invention will be described below with reference to the accompanying drawings in order that the present invention may be more clearly understood.

FIG. 1 is a side view of a cable winder mounted on a tractor for a construction machine.

FIG. 2 is a side view illustrating a hanging cable in FIG. 1.

Figure 3:
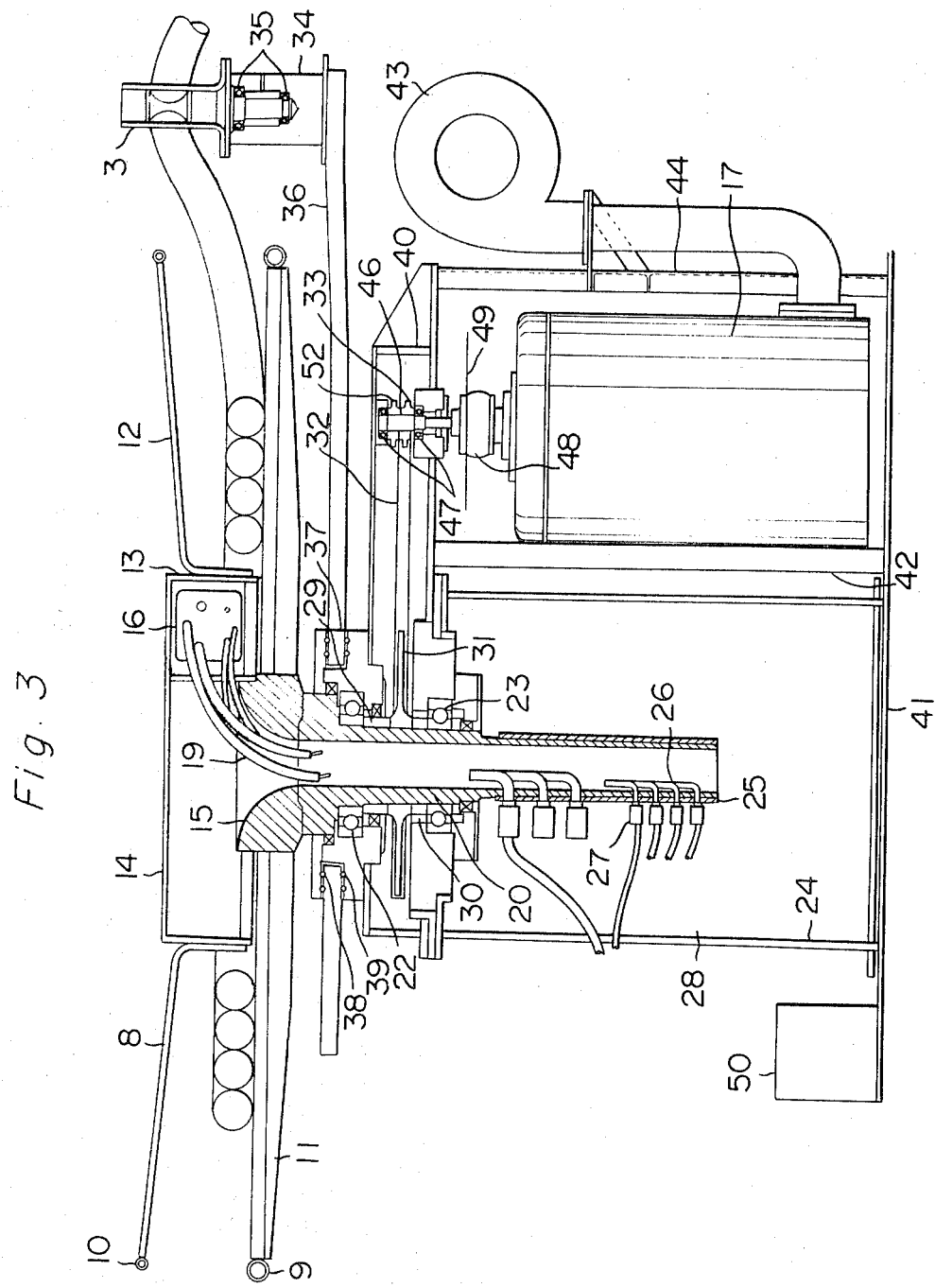
FIG. 3 is an enlarged view showing the main parts of the cable winder partially broken away in FIG. 1.

In FIG. 1 cable 1 is lifted up to the height B of pulley 3 from ground A while it is crawling on the ground from electric source 2 designated provisionally and is wound up onto reel assembly 8 on tractor 60.

On tractor 60 is fixed cable winder assembly 21 and reel assembly 8 are mounted on an inner shaft. The inner shaft is driven with torque motor adjacent to it through a chain mechanism.

In FIG. 1 in light of one cardinal point at point B on pulley 3, the cable hanging from point B to point A is pulled by gravity at point B in the direction the cable is unwound from the reel. In this case unless the reel is braked, the rotation of the reel is prevented with said torque motor, or there is some other device, the cable will rotate the reel by the gravity of the cable. In the present invention said torque motor is adapted to balance cable winding power and gravitational unwinding power at the stationary state of the tractor. That is, the height CB of a pulley and distance CA are set so that the force obtained by multiplying the weight empty of the cable in AB by sprocket ratio equals the cable winding power of the torque motor at the stationary state of the tractor.

Figure 4:
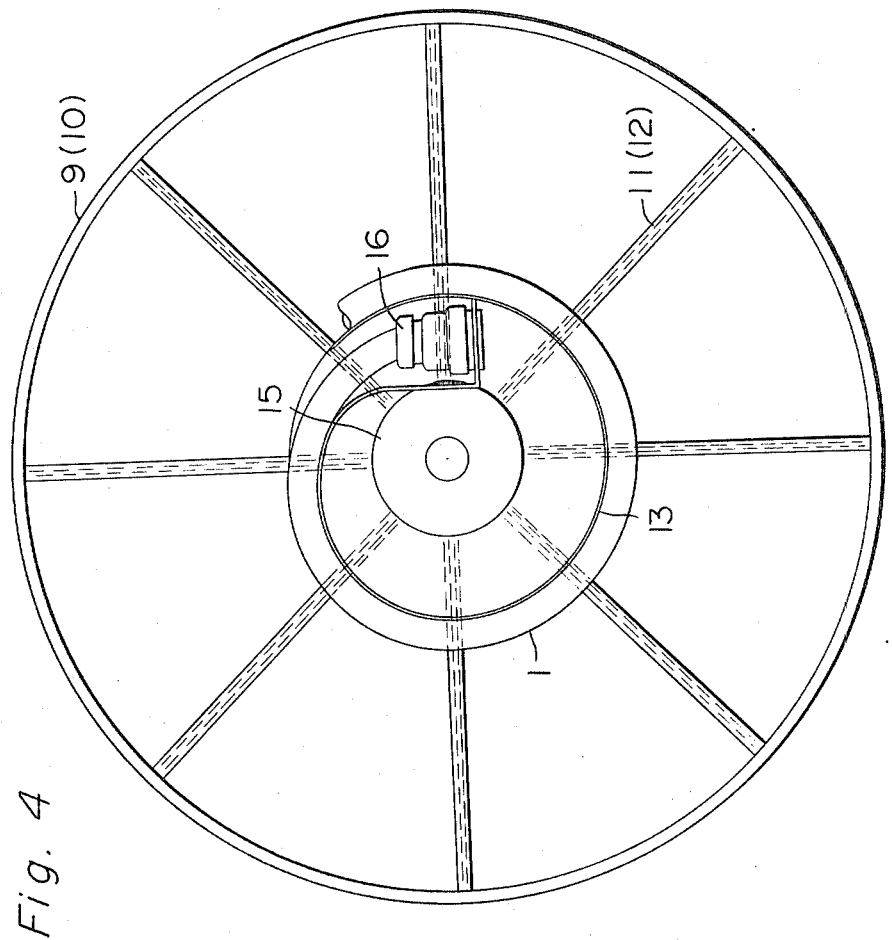
FIG. 4 is a plan view of a reel assembly in FIG. 1.

Reel assembly 8 positioned above the cable winder is, as shown in FIGS. 3 and 4, composed of block 15 located in the center; a plurality of stays 11 arranged radially with the center at block 15, the ends of which are fixed to rim 9, these making an under rim; spiral case 13 having a bottom mounted in the center of the under rim, part of which spiral case is welded and integrated with block 15; and a plurality of stays 12 arranged radially above and outside the spiral case, the ends of which are fixed to rim 10, making an upper rim. As described above, reel assembly 8 is composed of central block 15, spiral case 13 and upper and under rims, the spiral case being provided inside with connector 16 and above with detachable cover 14.

The peripheral wall of spiral case 13 is spirally formed to receive and store cable 1 wound from outside to inside along the wall, the terminal of which cable is connected to connector 16 mounted on spiral case 13. To the other end of connector 16 is connected a group of lead wires 19. The group of lead wires passes through the trumpet-shaped opening and runs down the inner hole of inner shaft 20.

Insulated outer pipe 25 is connected to the lower periphery of inner shaft 20. Numerous small holes are bored on the pipe. The lead wires each pass through the holes and soldered on sliprings 26 mounted vertically on an insulator. Brushes 27 each are pressed on each slipring, and lead wires connected to the other end of the brushes pass through the holes of case 24 and are led to the outside. Two lead wires are led to torque motor 17 and all the others to control device 50.

Inner shaft 20 is rotatably supported with two ball bearings 22 and 23. Inner shaft 20 receives the weight of the reel and the cable through ball bearing 22. Between ball bearings 22 and 23, there are distance collars 29 and 30 and chain sprocket 31 which is connected to another chain sprocket 33 via chain 32. Chain sprocket 33 is fixed to shaft 46 which is supported with two ball bearings 47 and connected to flexible coupling 48. The flexible coupling is connected to the shaft of torque motor 17. Hence the reel assembly is rotatable through chains 32. Gear 52 to rotate together with chain wheel 33 is connected to shaft 46. Its rotation is transmitted to a stop motion (not shown) via a gear train and the tractor is stopped just before the cable is unwound from the reel assembly. Chain mechanism 32 is made dustproof by covering it with a case bolted to slipring case 24, the bottom of which is bolted to plate 41. Angle 42 for supporting the torque motor and angle 44 for supporting torque motor fan 43 are fixed to plate 41 and the tops of the angles are fixed to case 40.

In the cable winder of the present invention, torque motor 17 is vertically positioned to facilitate the driving chain 32. The torque motor is positively cooled by the cooling air fed with fan 43 through a duct, and the cooling air which passes through the motor strikes against plate 49 and diffuses outside the cable winder.

Figure 5:
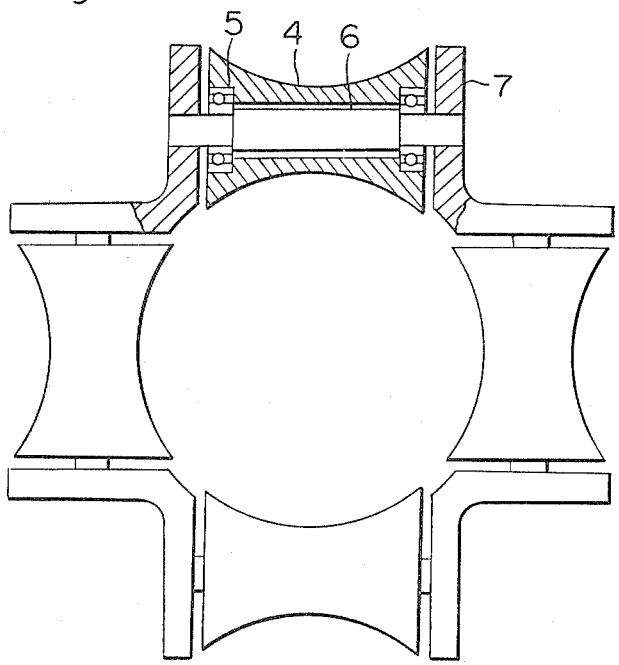
FIG. 5 is a side view of a pulley assembly partially broken away in FIG. 1.

Pulley assembly 3 is supported with fixed bracket 34 via two ball bearings 35. Bar 36 which supports ball bearings 38 and 39 is rotatably supported with boss 37. Thus pulley assembly 3 is freely rotatable to left and right. This pulley assembly is, as shown in FIG. 5, composed of four pulleys 4 rotatably mounted on holder 7 through ball bearing 5 and shaft 6. These four gourd-shaped pulleys form a hole as shown in the drawing at the time of assembling them to pass cable 1 through the hole. The function of the cable winder of the present invention will be described below.

When electricity is started to be supplied from an electric source, the primary motor, the torque motor and the motor for driving the fan start to rotate.

1. When a tractor stops:

If the operation is carried out when a tractor stops, the weight empty of the cable in AB becomes a tension to pull the cable, but the driving torque of the torque motor is adapted to balance the tension and the torque motor will not rotate, which in turn does not make the reel turn to keep the cable still.

2. When a tractor advances:

When a tractor advances, the cable tension pulls the cable from the tractor.

Figure 6:
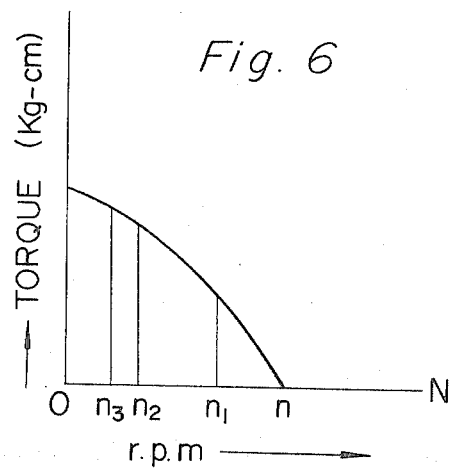
FIG. 6 is a diagram showing speeds of a torque motor for driving the reel assembly vs. its torque.

3. When a tractor retreats:

When a tractor moves backward, the cable is loosened, the torque of the torque motor overcomes the cable tension and the torque motor starts its regular rotation. As shown in FIG. 6, as the tractor retreats and the torque of the cable side decreases, the rotational speed N, of the torque motor increases from zero to $n_3$. As the reverse speed of the tractor increases further, the rate N of the torque motor increases. Thus the torque motor rotates at the revolution per minute, N, corresponding to the forward speed of the tractor. As described above, when the tractor retreats, the reel makes a regular rotation to wind the cable.

And when the tractor turns left or right, the cable bends in the turning direction of the tractor by the coworking of the radial reel and the rotatable bar to support the pulley assembly; there occurs no unforeseen accident of the cable being arrested by the shoe when the tractor turns round.

As described above, the cable winder of the present invention always allows the cable to follow the locus of maneuvering of the tractor (advance, turn, retreat, etc.) without the sliding of the cable along the ground, accidents due to cable wear, injuries, and breakages can be eliminated to speed up the operations and secure the safety thereof.

I claim:

1. A cable winder mounted on a tractor in which motors are used as a prime mover comprising a reel assembly, the center of which is formed by a spiral case holding a connector of a group of lead wires between the outer and inner walls spirally bent and by a block which is fixed to the bottom of the spiral case and which has an opening to pass a group of lead wires through, and which is composed of a pair of upper and under rims prepared by mounting a plurality of stays horizontally and radially on the upper and under edges of the center of the reel assembly respectively; a shaft rotatably supporting the reel assembly, which is provided with an inner hole; a vertical torque motor driving the shaft through a chain; a plurality of sliprings vertically mounted on the lower part of the shaft; and a pulley assembly supporting the cable whereby the rotation of the torque motor is controlled only by the tension of the cable hanging on the ground from the reel and thereby the cable is adapted to follow the locus of, or to stop, the maneuver of the tractor.

2. The cable winder according to claim 1 wherein the pulley assembly is fixed to the tip of a bar rotatably fixed to the periphery of the cable winder and composed of four gourd-shaped pulleys to form a cable path in the center of the pulleys.

* * * * *